United States Patent

Jachimowicz et al.

[11] Patent Number: 5,630,001
[45] Date of Patent: May 13, 1997

[54] IMAGE GENERATOR FOR USE IN IMAGE MANIFESTATION APPARATUS

[75] Inventors: Karen E. Jachimowicz, Laveen; Louis E. Silverstein, Scottsdale; George R. Kelly, Gilbert; Fred V. Richard, Scottsdale, all of Ariz.

[73] Assignee: Motorola, Schaumburg, Ill.

[21] Appl. No.: 447,297

[22] Filed: May 22, 1995

[51] Int. Cl.$^6$ ............................................. G02B 6/36
[52] U.S. Cl. ............................ 385/89; 385/116; 385/120
[58] Field of Search .............................. 385/89, 116, 120

[56] References Cited

U.S. PATENT DOCUMENTS

| | | | |
|---|---|---|---|
| 3,688,144 | 8/1972 | Harao et al. | 385/120 |
| 3,887,724 | 6/1975 | Diakides | 385/120 |
| 4,121,234 | 10/1978 | Altman et al. | 385/120 |
| 4,805,983 | 2/1989 | Tomoyori et al. | 385/120 |
| 4,808,815 | 2/1989 | Langley | 385/116 |
| 5,032,718 | 7/1991 | Murakami | 385/116 |
| 5,127,080 | 6/1992 | Duggan | 385/120 |

*Primary Examiner*—Rodney B. Bovernick
*Assistant Examiner*—Robert E. Wise
*Attorney, Agent, or Firm*—Eugene A. Parsons

[57] ABSTRACT

A planar substrate including a bundle of optical fibers extending from the first major surface to the second major surface and defining a mounting area on the first surface with a two-dimensional array of light emitting devices affixed thereto as an image generator. Real images are transmitted through the bundle to the appear as a real image at the second surface. A single fold optical magnifier including a plurality of optical elements having an aspheric field flattening light inlet positioned adjacent the second surface to receive the real image from the second surface of the substrate.

15 Claims, 3 Drawing Sheets

IMAGE GENERATOR FOR USE IN IMAGE MANIFESTATION APPARATUS

FIELD OF THE INVENTION

The present invention pertains to image generators and more specifically to image generators utilized in conjunction with optical magnifiers.

BACKGROUND OF THE INVENTION

With the advent of the communications era, one of the major markets for optical devices is portable electronics equipment, such as cellular telephones, pagers, two-way radios, data banks, computers and the like. Generally, it is desirable that the optical source devices in this type of equipment are compact, low power, inexpensive and include high quality optics with large angular magnification. To this end very small image generators are utilized which include a two-dimensional array of light emitting devices.

In one embodiment the two-dimensional array is formed on a semiconductor chip. For purposes of electrical connection, the semiconductor chip is mounted on a transparent substrate with the image being transmitted through the substrate. Also, in many organic electroluminescent diodes the diode is formed directly on a transparent substrate. In these structures optical magnifiers are utilized to produce a large enough image to be easily perceived. Such prior structures are disclosed in a copending U.S. patent application entitled "A Single Fold Optical Magnifier For Use in Image Manifestation Apparatus", with Ser. No. 08/405,057, filed on Mar. 16, 1995 and assigned to the same assignee, which patent application is hereby incorporated herein by reference.

A problem with all of these structures is that the optical magnifiers are spaced from the generated image by at least the thickness of the transparent substrate. This spacing imposes limitations on the optical magnifiers.

PRIOR ART

Several different attempts have been made to provide optical systems for portable electronic devices, one of which includes all refractive or reflective optics with a single line of pixels and a vibrating mirror. The single line of pixels is sequenced through the rows of a raster and, simultaneously, the vibrating mirror scans the line of pixels to properly position each subsequent row in its proper orientation. The problem with this system is the high accuracy of timing required, the amount of power used and the blurring of the ultimate image by the vibrations of the mirror. Also, this system is extremely fragile and not conveniently adaptable to the rough use normally occurring in portable equipment.

The system that is normally used at the present time is one using a large image source and either a direct view image or low magnification optics. The major problem with this system is that it greatly limits the size of the portable electronics on which it is used. Basically, the image must be large enough for an operator to read and/or understand the information being displayed. Thus, for example, if one wanted to display an 8.5" by 11" sheet of paper (a standard letter), the direct view display must be 8.5" by 11" to be easily read. Such a display is clearly too large to be incorporated into most portable communications devices, such as pagers, two-way radios, cellular phones and the like.

It would be highly desirable to devise an image generator constructed to have an optical magnifier mounted adjacent thereto with the attributes of being compact and inexpensive.

It is a purpose of the present invention to provide a new and improved image generator.

It is another purpose of the present invention to provide a new and improved image generator which incorporates low pass spatial filtering to eliminate high spatial frequency components of an image, present in pixel edges.

It is another purpose of the present invention to provide a new and improved image generator constructed to operate in conjunction with a very small, compact and relatively inexpensive optical magnifier.

It is a further purpose of the present invention to provide a new and improved image generator constructed to operate in conjunction with a compact and relatively inexpensive optical magnifier small enough to conveniently fit in portable electronic equipment.

SUMMARY OF THE INVENTION

The above problems and others are substantially solved and the above purposes and others are realized in an image generator for image manifestation apparatus including a supporting substrate with opposed first and second major surfaces, the supporting substrate includes a bundle of spatially coherent optical fibers extending from the first major surface to the second major surface and defines a mounting area on the first major surface. A two-dimensional array of light emitting devices is affixed to the mounting area of the supporting substrate so as to direct light from the array of light emitting devices into the bundle of optical fibers at the first major surface, the light being directed to the second major surface of the supporting substrate by the bundle of optical fibers.

In a specific embodiment, driver circuits are coupled to the array of light emitting devices and include a data input terminal. Each light emitting device of the array of light emitting devices is individually addressable by the driver circuits so as to generate a real image including one of a plurality of lines of alpha-numerics and graphics from data received at the data input. The real image is transmitted from the first major surface of the supporting substrate to the second major surface of the supporting substrate by the bundle of spatially coherent optical fibers.

In a further specific embodiment a plurality of optical elements are provided having a light inlet positioned adjacent the second surface of the supporting substrate and a light outlet directed at an angle to the inlet, with a reflecting surface optically positioned between the inlet and the outlet so as to direct light from the inlet to the outlet. The plurality of optical elements define a light path from the light inlet to the light outlet with a total average optical length in the range of approximately 20 to 35 millimeters. Further, the plurality of optical elements are constructed to angularly magnify the real image at the light inlet of the first optical element into a virtual image greater than ten times larger than the real image.

BRIEF DESCRIPTION OF THE DRAWINGS

Referring to the drawings.

DESCRIPTION OF THE PREFERRED EMBODIMENTS

Figure 1:
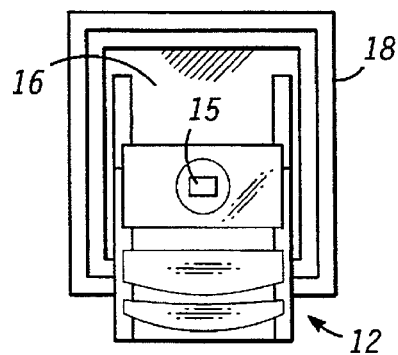
FIG. 1 is a view in top plan of image manifestation apparatus employing a single fold optical magnifier.
Figure 2:
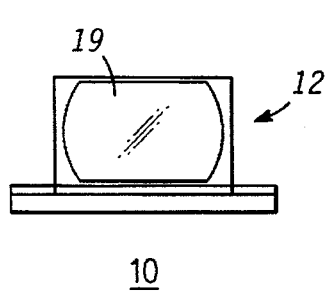
FIG. 2 is a front view of the apparatus illustrated in FIG. 1.
Figure 3:
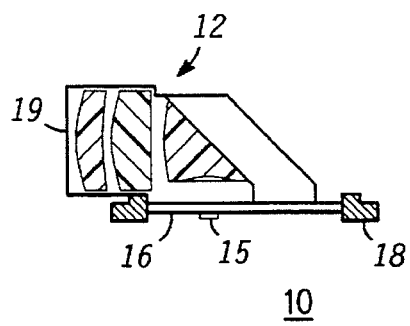
FIG. 3 is a view in side elevation, portions thereof broken away and shown in section, of the apparatus illustrated in FIG. 1.

FIGS. 1, 2 and 3 illustrate a top plan view, front view, and side elevation of miniature image manifestation apparatus 10. FIGS. 1, 2 and 3 illustrate miniature image manifestation apparatus 10 approximately the actual size to provide some indication as to the sizes and thicknesses being referred to herein. Apparatus 10 includes a two dimensional array 15 of light emitting devices and, in this specific embodiment, array 15 includes 144 light emitting devices by 240 light emitting devices which, in combination, define an image plane. Each light emitting device is fabricated approximately 20 microns on a side with a center-to-center spacing between adjacent devices of no more than 20 microns. Each light emitting device is turned ON with approximately 1.8 volts and utilizes approximately 50 µA of current when it is turned ON. Array 15 produces a luminance less than approximately 15 fL.

Figure 4:
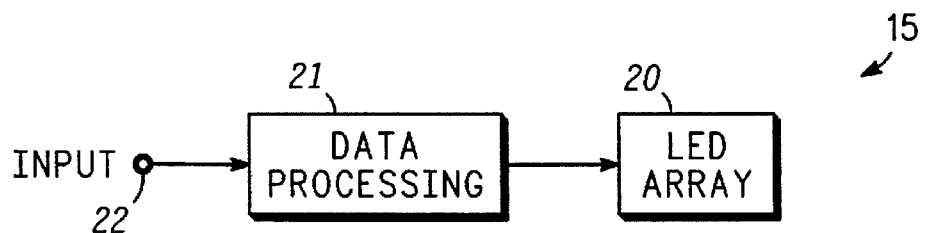
FIG. 4 is a simplified block diagram of an image generator associated with the apparatus of FIG. 1.

Array 15 is illustrated in more detail in FIG. 4 and includes, for example, semiconductor electronics such as a light emitting device (LED) array 20 driven by data processing circuits 21. The LEDs may be, for example, organic or inorganic light emitting diodes, organic electroluminescent diodes, vertical cavity surface emitting lasers, field emission devices, LCDs, etc. Data processing circuits 21 include, for example, logic and switching circuit arrays for controlling each LED in LED array 20, drivers and the like. Data processing circuits 21 include, in addition to or instead of the logic and switching arrays, a microprocessor or similar circuitry for receiving data at an input terminal 22 and processing the data to produce a desired real image in the image plane of a device such as LED array 20.

Figure 5:
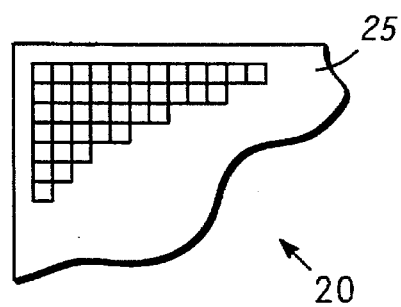
FIG. 5 is an enlarged view in top plan of an array of light emitting devices, portions thereof broken away, forming a portion of the image generator of FIG. 4.

In this specific embodiment LED array 20 is utilized because of the extremely small size that can be achieved and because of the simplicity of construction and operation. Referring specifically to FIG. 5, a plan view of LED array 20 is illustrated in which pixels are formed in a regular pattern of rows and columns on a single substrate (e.g. a semiconductor chip) 25. Each pixel includes at least one LED, with additional parallel LEDs being included, if desired, for color, additional brightness and/or redundancy. By addressing specific pixels by row and column in a well known manner, the specific pixels are energized to produce a real image in the image plane of LED array 20. Digital or analog data is received at input terminal 22 and converted by data processing circuits 21 into signals capable of energizing selected pixels to generate the predetermined real image. The digital or analog data is received from any data source, such as a communication receiver, a memory or data bank, or other portable electronic device, etc.

It will be understood by those skilled in the art that LED array 20 and substrate 25 are greatly enlarged in FIG. 5. Also, while data processing circuits 21 are represented by a separate block, it will be understood that in some applications they may be formed around the edge of LED array 20 on substrate 25. The actual size of substrate 25 is on the order of a few milli-meters (e.g. 3 to 10) along each side with each LED being on the order of 5 to 50 microns on a side (or in diameter if the LED is round).

Because of the extremely small size of substrate 25, drive lines or metal connecting traces between LEDs, have a very small cross-section, which severely limits their current carrying capacity, or current density. Referring to FIG. 5 for example, in one typical operation only a row at a time is addressed or "turned ON". Thus, the metal trace for each column needs to carry only sufficient current for one LED (the one LED in the row which is ON). However, all of the LEDs in the ON row could potentially be turned ON simultaneously. Thus, the metal trace for the ON row, which can potentially be required to carry current for however many LEDs are in the row (e.g. 100 to 1500 LEDs), must carry many times as much current as the column metal traces.

Array 15 is mounted on the under-surface of a supporting substrate 16, which in this specific example is glass, and a driver board 18 is bump-bonded to supporting substrate 16. Additional information on driver boards and bonding of substrates to the driver boards is disclosed in a copending United States patent application entitled "Integrated Electro-optical Package", Ser. No. 08/216,995, filed on Mar. 24, 1994 and assigned to the same assignee, which information is included herein by reference.

Single fold optical magnifier 12 is also mounted on supporting substrate 16 and includes a plurality of optical elements defining a light path from array 15 to a viewing aperture 19, best seen in FIG. 2. The plurality of optical elements are constructed to angularly magnify images, generated by array 15, at a light inlet of a first optical element by greater than ten. Because of the length of the optical path and the size of array 15 (the real image), the horizontal field of view of the optics ranges from approximately 11 degrees at a magnification of 10× to 22 degrees at a magnification of 20×, with the present embodiment having a horizontal field of view of approximately 16 degrees and a magnification of 15×.

Figure 6:
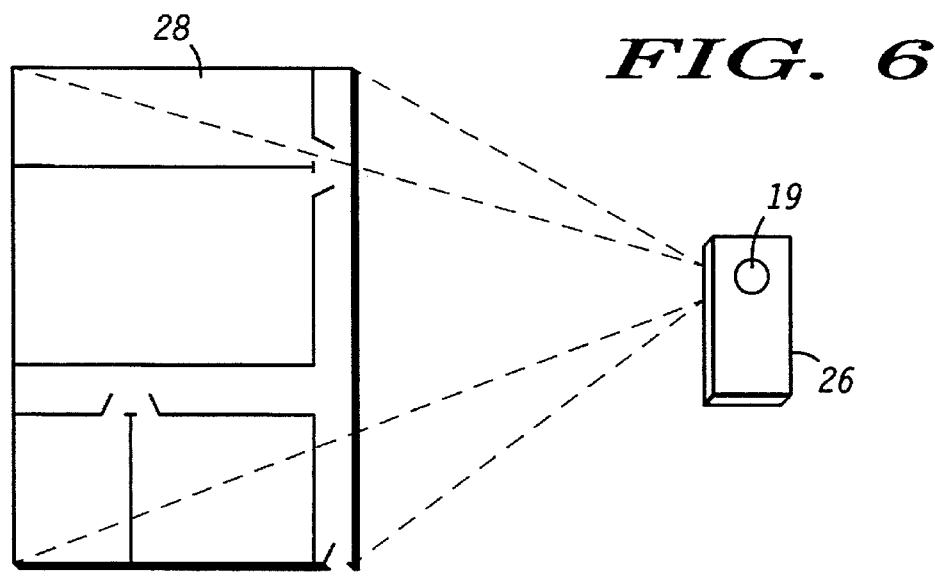
FIG. 6 is a view in perspective illustrating a typical view as seen by the operator of portable communications equipment employing the image manifestation apparatus of FIG. 1.

Referring to FIG. 6, a perspective view of portable, or hand-held, electronics equipment 26 is illustrated with miniature image manifestation apparatus 10 mounted therein so that only a viewing aperture 19 is visible. FIG. 6 further illustrates a typical view 28 seen by an operator looking into viewing aperture 19 of electronics equipment 26, which view 28 appears to be behind electronics equipment 26 and is sufficiently large (e.g. 8.5"×11") to be easily perceived by an operator. View 28 could be, for example, a floor plan of a building about to be entered by the operator (a policeman). The floor plan is on file at the police station and, when assistance is requested by the policeman, the station simply transmits the previously recorded plan. Similarly, electronics equipment 65 might be utilized to transmit pictures of missing persons or wanted criminals, maps, extremely long messages, etc. Many other variations, such as silent receiver operation wherein the message appears in viewing aperture 19 instead of audibly, are possible.

Figure 7:
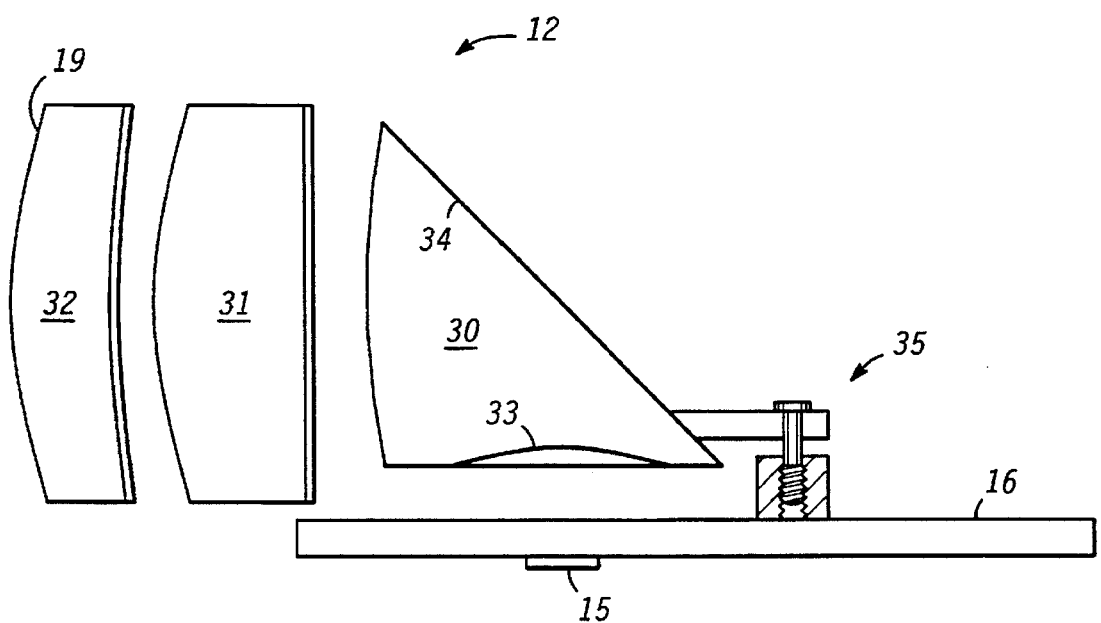
FIG. 7 is a 4× magnified view in side elevation of a prior embodiment of the apparatus illustrated in FIG. 1.

Referring specifically to FIG. 7, a 4× magnified view in side elevation of portions of a prior embodiment of apparatus 10 of FIG. 1 is illustrated for clarity. From this view it can be seen that the plurality of optical elements includes a first optical element 30 and an optical lens 31. A low power optical lens 32 is included as an example of possible extensions of the magnifier. Optical element 30 is formed as a prism to enable increased angular magnification (reduced effective focal length) in the same volume of space compared to the use of a simple turning mirror in the air. Optical elements 30, 31 and 32 are molded from an optical quality plastic, which it is generally understood is material having a high index of refraction, between approximately 1.5 and 1.6.

In this embodiment, a light inlet 33 takes the form of an aspheric field flattening concave surface molded directly into element 30 and formed as an integral part thereof. It will be understood, however, that light inlet 33 could be formed as a separate lens and subsequently positioned in optical alignment with the lower surface of element 30. A reflecting surface 34 is disposed to fold or bend light passing through first element 30 at an angle of approximately 95°. It has been found, for example, that an angle of 95° avoids vignetting on the lower part of the image at aperture 19 of optical magnifier 12.

The plurality of optical elements, including first element 30 and optical lens 31, define a light path from light inlet 33 of first element 30 to aperture 19. To fabricate a single fold optical magnifier that is useful in portable electronic devices, the total average optical length of the optical path should be in the range of approximately 15 to 35 millimeters. In this embodiment the optical path from light inlet 33 to aperture 19 is approximately 20 millimeters. Here it should be noted that because of the very small optical magnifier 12 and array 15 and the fact that a virtual image is utilized, rather than a direct view display, the overall physical dimensions of miniature image manifestation apparatus 10 are approximately 1.5 inches (3.8 cm) wide by 0.75 inches (1.8 cm) high by 1.75 inches (4.6 cm) deep, or a total volume of approximately 2 cubic inches (32 cm$^3$), of which less than 0.7 cubic inches is the optic volume.

In many applications it may be desirable to include apparatus for focusing the final image. This apparatus allows the viewer to position the virtual image in space, producing a sharp, clear image. To this end, element 30 (and elements 31 and 32, if desired) is mounted on substrate 16 by means of a threaded adjustment 35 which can be rotated by a thumb screw, screwdriver, etc., to move the fixed assembly of elements 30, 31 and 32 vertically toward and away from substrate 16 and array 15. Focusing is accomplished by simply changing the distance between light inlet 33 and the image generated on array 15.

Because of the small size of optical magnifier 12 and the very short optical path, supporting substrate 16 creates a problem. The real image generated by LED array 15 is in an image plane at the lower surface of supporting substrate 16. In order to maximize the focal range over which the virtual image can be positioned, light inlet 33 should be allowed to come very close to this image plane. That is, the dimension "d" between the image plane and light inlet 33 should be very small. However, the thickness of supporting substrate 16 introduces a minimum dimension for "d", which limits how close light inlet 33 can get to the image plane. The thickness of supporting substrate 16 not only limits the focal length but also introduces a limit into the amount of movement allowed in the focusing system by dictating the minimum spacing "d" between light inlet 33 and the image plane.

Figure 8:
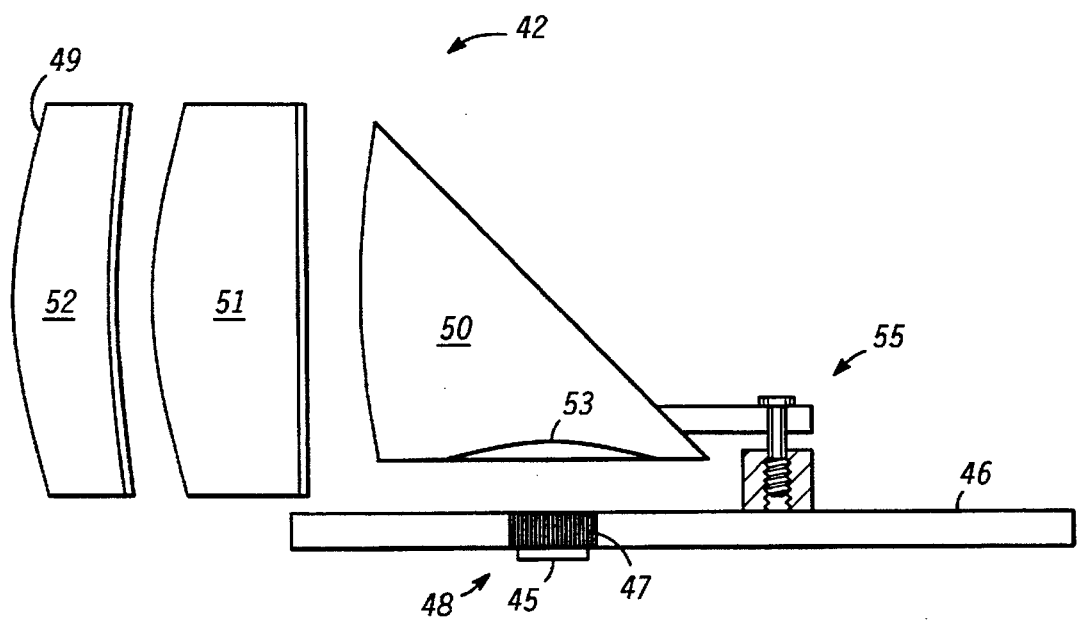
FIG. 8 is a 4× magnified view in side elevation of an embodiment of the apparatus illustrated in FIG. 1 in accordance with the present invention.

Referring specifically to FIG. 8, a 4× magnified view in side elevation of portions of an embodiment of miniature image manifestation apparatus 40 in accordance with the present invention is illustrated. A two-dimensional LED array 45 is mounted on the under-surface of a supporting substrate 46, which in this specific example is glass. A single fold optical magnifier 42 is also mounted on supporting substrate 46 and includes a plurality of optical elements defining a light path from LED array 45 to a viewing aperture 49. The plurality of optical elements includes a first optical element 50, an optical lens 51 and a low power optical lens 52. In this embodiment, a light inlet 53 takes the form of an aspheric field flattening concave surface molded directly into element 50 and formed as an integral part thereof. Focusing is accomplished by simply changing the distance between light inlet 53 and the image generated on LED array 45 through the operation of a threaded adjustment 55.

Miniature image manifestation apparatus 40 in accordance with the present invention includes a supporting substrate 46 formed with a bundle of spatially coherent optical fibers 47 extending, with all of the optical fibers in parallel, from the lower major surface to the upper major surface thereof and defining a mounting area 48 on the lower major surface. Generally, supporting substrate 46, or at least the portion of supporting substrate 46 defined as mounting area 48, is formed by fixedly bonding a bundle of optical fibers together in parallel and slicing a thin layer from the end to form a generally planar element with opposed major surfaces. While the optical fibers can be either the glass or the plastic variety, glass is preferred because of its superior ability to withstand heat (which may be generated during subsequent assembly or fabrication steps). It should be understood that while planar surfaces are usually used, fibers with lenslets on one or the other end, or variable refractive indices, or other light bending capabilities, can be used.

LED array 45 can be formed on a semiconductor chip, as previously described, with the image being developed at an image surface of the semiconductor chip. The semiconductor chip is then mounted on the lower surface of supporting substrate 46 with the image surface parallel and adjacent mounting area 48. In a different embodiment, organic electroluminescent diodes can be formed directly on the lower surface of supporting substrate 46 so as to define an image plane in the plane of the lower surface of supporting substrate 46.

Figure 9:
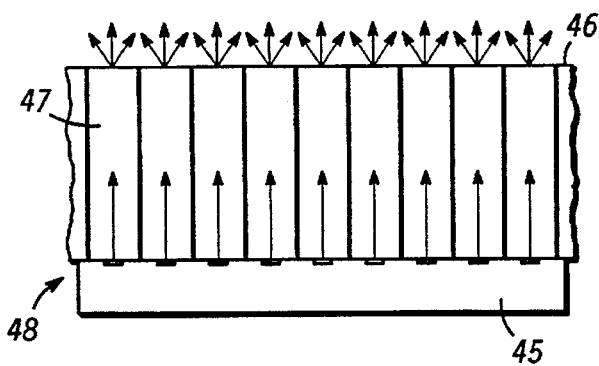
FIG. 9 is a greatly enlarged sectional view of a portion of the apparatus illustrated in FIG. 8.

In either case, bundle of optical fibers 47 transfers, or transmits, the image plane from the lower surface of supporting substrate 46 to the upper surface of supporting substrate 46, as illustrated in FIG. 9. By transferring the image plane from the lower surface to the upper surface, the image source appears to optical magnifier 42 as though it is positioned in the upper surface, rather than the lower surface. Thus, light inlet 53 can be moved downwardly until it is touching supporting substrate 46, at which point dimension "d" becomes zero. Thus, supporting substrate 46 with bundle of optical fibers 47 eliminates the limit in the focusing range by reducing the minimum spacing "d" between light inlet 53 and the image plane to a minimum of zero.

Figure 10:
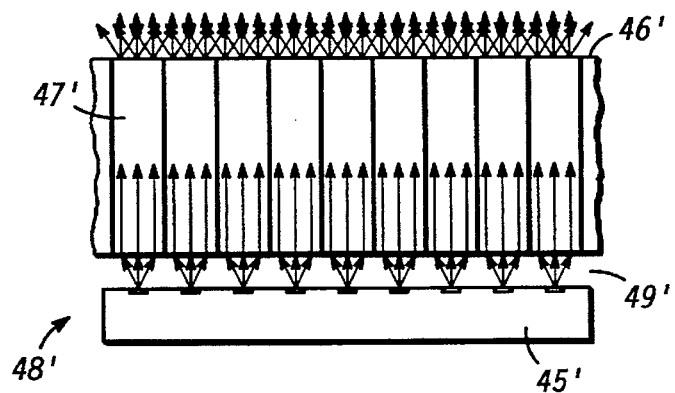
FIG. 10 is a view similar to FIG. 9 illustrating a different embodiment in accordance with the present invention.

Referring to FIG. 10, a different embodiment is illustrated in which a supporting substrate 46' is provided, which is similar to previously described supporting substrate 46 of FIG. 9. A two-dimensional array 45' of LEDs is provided which is also similar to two-dimensional array 45 of FIG. 9. However, in this embodiment array 45' is affixed to mounting area 48' of supporting substrate 46' so as to leave a small space 49' between the lower surface of supporting substrate 46 and the image surface of array 45'. In this embodiment, supporting substrate 46' not only transfers the image plane from the lower surface to the upper surface but also provides low pass spatial filtering action.

As array 45' is moved away from the lower surface of supporting substrate 46' the individual fibers in bundle 47' will start to collect light from more than one pixel (generally one LED, or three if the image is in color), thereby spatially averaging, or low pass filtering the high spatial frequency content from the image. This is desirable in image manifestation apparatus 40' (see 40 in FIG. 8) because the highest spatial frequencies generated by the imagery correspond to pixel (or LED) edges, which do not contain image information and so essentially constitute noise in the image. By tailoring the numerical aperture and diameter of optical fibers in bundle 47' of supporting substrate 46' and the distance between array 45' and the lower surface of supporting substrate 46', the low pass spatial filter cutoff frequency can be conveniently tailored.

A new and improved image generator is disclosed which can be used with compact optical systems to allow greater flexibility in optical design and a larger focusing range. Also, the new and improved image generator provides the capability to low pass filter the image, reducing high spatial frequency pixel edge noise from the image. Thus, the present invention makes optical design of small compact optical systems easier and improves image quality and ultimate device usability.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. An image generator for image manifestation apparatus comprising:

a supporting substrate with opposed first and second major surfaces, the supporting substrate including a bundle of optical fibers extending from the first major surface to the second major surface and defining a mounting area on the first major surface; and a two-dimensional array of light emitting devices affixed to the mounting area of the supporting substrate so as to direct light from the array of light emitting devices into the bundle of optical fibers at the first major surface, the light being directed to the second major surface of the supporting substrate by the bundle of optical fibers, wherein the array of light emitting devices is an array of organic light emitting devices formed on the first surface of the supporting substrate.

2. An image generator for image manifestation apparatus comprising:

a supporting substrate with opposed first and second major surfaces, the supporting substrate including a bundle of optical fibers extending from the first major surface to the second major surface and defining a mounting area on the first major surface;

a two-dimensional array of light emitting devices affixed to the mounting area of the supporting substrate so as to direct light from the array of light emitting devices into the bundle of optical fibers at the first major surface, the light being directed to the second major surface of the supporting substrate by the bundle of optical fibers; and driver circuits coupled to the array of light emitting devices and including a data input terminal, each light emitting device of the array of light emitting devices being individually addressable by the driver circuits so as to generate a real image including one of a plurality of lines of alpha-numerics and graphics from data received at the data input, the real image being transmitted from the first major surface of the supporting substrate to the second major surface of the supporting substrate by the bundle of optical fibers.

3. An image generator for image manifestation apparatus as claimed in claim 2 wherein the array of light emitting devices includes a single semiconductor substrate with the light emitting devices being formed thereon and defining an image surface, the real image being generated at the image surface.

4. An image generator for image manifestation apparatus as claimed in claim 3 wherein the array of light emitting devices is mounted on the supporting substrate with the image surface spaced from the first surface of the supporting substrate so as to provide low pass spatial filtering of the real image.

5. Image manifestation apparatus with an image generator comprising:

a supporting substrate with opposed first and second major surfaces, the supporting substrate including a bundle of optical fibers extending from the first major surface to the second major surface and defining a mounting area on the first major surface;

a two-dimensional array of light emitting devices affixed to the mounting area of the supporting substrate so as to direct light from the array of light emitting devices into the bundle of optical fibers at the first major surface, the light being directed to the second major surface of the supporting substrate by the bundle of optical fibers;

driver circuits coupled to the array of light emitting devices and including a data input terminal, each light emitting device in the array of light emitting devices being individually addressable by the driver circuits so as to generate a real image including one of a plurality of lines of alpha-numerics and graphics from data received at the data input, the real image being transmitted from the first major surface of the supporting substrate to the second major surface of the supporting substrate by the bundle of optical fibers;

a plurality of optical elements having a light inlet positioned adjacent the second surface of the supporting substrate and a light outlet directed at an angle to the inlet, with a reflecting surface optically positioned between the inlet and the outlet so as to direct light from the inlet to the outlet;

the plurality of optical elements defining a light path from the light inlet to the light outlet with a total average optical length in the range of approximately 20 to 35 millimeters; and the plurality of optical elements being constructed to angularly magnify the real image at the light inlet of the first optical element into a virtual image greater than ten times larger than the real image.

6. Image manifestation apparatus with an image generator as claimed in claim 5 wherein the optical elements include at least one aspheric surface for aberration correction.

7. Image manifestation apparatus with an image generator as claimed in claim 5 wherein the optical elements include at least one diffractive optical element positioned in the light path so as to provide aberration correction.

8. Image manifestation apparatus with an image generator as claimed in claim 5 wherein the plurality of optical elements are mounted with limited movement of the image input toward and away from the second surface of the supporting substrate so as to provide focusing of the virtual image at the light outlet.

9. Image manifestation apparatus with an image generator as claimed in claim 5 wherein the array of light emitting devices includes a single semiconductor substrate with the light emitting devices being formed thereon and defining an image surface, the real image being generated at the image surface.

10. Image manifestation apparatus with an image generator as claimed in claim 9 wherein the array of light emitting devices is mounted on the supporting substrate with the image surface spaced from the first surface of the supporting substrate so as to provide low pass spatial filtering of the real image.

11. Image manifestation apparatus with an image generator as claimed in claim 5 wherein the array of light emitting devices is an array of organic light emitting devices formed on the first surface of the supporting substrate.

12. Image manifestation apparatus with an image generator comprising;

a supporting substrate with opposed first and second major surfaces, the supporting substrate including a bundle of optical fibers extending from the first major surface to the second major surface and defining a mounting area on the first major surface;

an image generator including a two dimensional array of light emitting devices and driver circuits coupled to the light emitting devices and including a data input terminal, the light emitting devices being individually addressable by the driver circuits so as to generate a real image at an image surface, the real image including one of a plurality of lines of alpha-numerics and graphics from data received at the data input, the image generator being mounted on the supporting substrate with the image surface positioned adjacent and parallel to the mounting area so that the real image at the image surface is transmitted by the bundle of optical fibers as a real image on the second surface of the supporting substrate; and a single fold optical magnifier having an image inlet positioned adjacent the second surface of the supporting substrate so as to receive the real image from the bundle of optical fibers, the magnifier including a plurality of optical elements having a light inlet defining the image inlet of the single fold optical magnifier and a light outlet directed at an angle to the inlet, with a reflecting surface optically positioned between the inlet and the outlet so as to direct light from the inlet to the outlet, the light outlet defining a viewing aperture and the plurality of optical elements producing, from the real image on the second surface of the supporting substrate, a virtual image viewable at the viewing aperture;

the plurality of optical elements defining a light path from the light inlet to the light outlet with a total average optical length in the range of approximately 15 to 35 millimeters, at least one aspherical surface on one of the first optical element and the optical lens and positioned in the light path to correct for aberration; and at least one diffractive optical element positioned in the light path so as to provide additional aberration correction; and the plurality of optical elements being constructed to angularly magnify the real image generated by the image generator into a virtual image greater than ten times larger than the real image.

13. An image generator for image manifestation apparatus as claimed in claim 12 wherein the array of light emitting devices includes a single semiconductor substrate with the light emitting devices being formed thereon and defining an image surface, the real image being generated at the image surface.

14. An image generator for image manifestation apparatus as claimed in claim 13 wherein the array of light emitting devices is mounted on the supporting substrate with the image surface spaced from the first surface of the supporting substrate so as to provide low pass spatial filtering of the real image.

15. An image generator for image manifestation apparatus as claimed in claim 12 wherein the array of light emitting devices is an array of organic light emitting devices formed on the first surface of the supporting substrate.

* * * * *